United States Patent [19]

Schloemer

[11] Patent Number: 5,206,882
[45] Date of Patent: Apr. 27, 1993

[54] SYSTEM FOR AND METHOD OF CREATING AND ASSIGNING ADDRESS CODES IN A CELLULAR SPREAD SPECTRUM SYSTEM

[76] Inventor: Gerald R. Schloemer, P.O. Box 307, Round Lake, Ill. 60073

[21] Appl. No.: 667,803

[22] Filed: Mar. 11, 1991

[51] Int. Cl.⁵ ............................................. H04L 27/30
[52] U.S. Cl. .......................................... 375/1; 380/34; 370/18; 379/59; 455/33.1; 455/54.1; 455/56.1; 455/67.3
[58] Field of Search ...................... 379/59, 60; 455/33, 455/54, 56, 63, 67, 33.1, 54.1, 56.1, 67.1, 67.3; 375/1; 380/34; 370/18

[56] References Cited

U.S. PATENT DOCUMENTS 4,563,774  1/1986  Gloge ................................. 375/1 X
4,736,453  4/1988  Schloemer ............................ 455/33

OTHER PUBLICATIONS

A. Eizenhöfer, "The Hybrid Transmission Scheme of a 900 MHz Digital Land Mobile Radio System"; IEEE Jour. on Selected Areas In Comm., (vol. Sac-5, No. 5, Jun. 1991; pp. 824-833).

A. Abdelmonem, "Performance Analysis of Spread Spectrum Packet Radio Network With Channel Load Sensing"; IEEE Jour. on Selected Areas In Comm., (vol. 7, No. 1, Jan. 1989; pp. 161-166).

Primary Examiner—Bernarr E. Gregory
Attorney, Agent, or Firm—Leo J. Aubel

[57] ABSTRACT

A system and method for developing and assigning address codes in a radiotelephone communication system using spread spectrum modulation techniques based upon an analysis of signal strength and without reference to a geographic pattern.

6 Claims, 5 Drawing Sheets

SYSTEM FOR AND METHOD OF CREATING AND ASSIGNING ADDRESS CODES IN A CELLULAR SPREAD SPECTRUM SYSTEM

BACKGROUND

A basic concept of cellular radio telephone systems is that of enabling the allocated communicating channels to be reused several times in a given metropolitan or geographic area which results in increased spectral efficiency of the systems. However, because of the explosive growth in the number of users using the systems, the channel capacity and the dropped call rate in those cellular systems located in the large metropolitan areas have become important issues.

Various systems and technologies have been proposed for increasing the number of users in a system, and for reducing the dropped call rate. One such proposed technology comprises spread spectrum modulation with code division multiple access (CDMA), techniques. In such system, each potential user is given a unique code, and when the user wants to communicate, his or her code becomes part of the transmission.

The article "The Hybrid Transmission Scheme of a 900 MHz Digital Land Mobile Radio System", by Eizenhofer et al, IEEE, June 1991, discusses a hybrid transmission scheme for spread spectrum with cellular style radio systems in mind. Eizenhofer proposes a different modulation/coding scheme for the talk out (base to mobile) than he proposes for the talk back (mobile to base). Eizenhofer discusses methods for choosing codes that have good distance (low correlation) between them. Eizenhofer points out that codes with good distance between them need to be synchronized to prevent accidental correlations that would occur if they would not all start at the same time. Eizenhofer proposes using digitally coded voice signals. However, Eizenhofer does not mention the need for different reduced code sets at alternate base sites to control accidental interference between alternate sites.

The article "Performance Analysis of Spread Spectrum Packet Radio Network With Channel Load Sensing" by Abdelmonem et al, IEEE, January 1989, discusses the choice of codes in a large system, and concludes that because of practical limitations of designing a large set of orthogonal codes that a channel traffic loading sensor is important when traffic gets too high. They article does not mention the possibility of using smaller subsets of codes for different portions of the larger system.

In CDMA, users do not have to be assigned channels in advance, and many users can communicate simultaneously in a given band of spectrum. By using radio receivers that can search for selected codes, a signal within a broad band can be received even though that signal is weaker than other signals that are present. As an example, assume that in a given frequency band, a transmitter is coupled to a random noise source to transmit unwanted signals. A radio receiver assigned a given code can pick up a desired signal from a different transmitter transmitting the code and the desired signal, even though the desired signal is 20 DB weaker than unwanted signals.

In contrast to spread spectrum and CDMA technology, in conventional narrow band FM a desired signal needs to be about 15 DB stronger than the unwanted signals to provide good communication. Assume a cellular FM system of 25 KC width channels, so theoretically there could be 40 usable channels in one megacycle bandwidth. Commonly, cellular systems have a frequency plan reuse of 6 cells. Thus, in a one megacycle band, 40 (channels) divided by 6 (cells) results in about 7 users at a single site. U.S. Pat. No. 4,736,453 issued to the inventor herein, discloses a system and method for increasing the number of users to 9 to 12 users per single site. Thus, initial cellular systems can accommodate 7 users per site per megacycle, and cellular systems improved by U.S. Pat. No. 4,736,453 can increase the users to 9 to 12 per site per megacycle.

Theoretically, spread spectrum with CDMA technology can accommodate 30-40 users per site per megacycle. However, in actual practice the efficiency of spread spectrum with CDMA technology has been found to be significantly less than the indicated anticipated efficiency as will be described hereinbelow.

SUMMARY OF INVENTION

A system and method are described for increasing the actual spectral efficiency of spread spectrum with CDMA technology by comparing actual signal strengths used by users of the system, determining those users of the systems that might or could interfere with each other, and assigning temporary alternative, modified or short codes on a real time basis to those users.

The foregoing features and advantages of the present invention will be apparent from the following more particular description of the invention. The accompanying drawings, listed hereinbelow, are useful in explaining the invention wherein.

DESCRIPTION OF INVENTION

Figure 1:
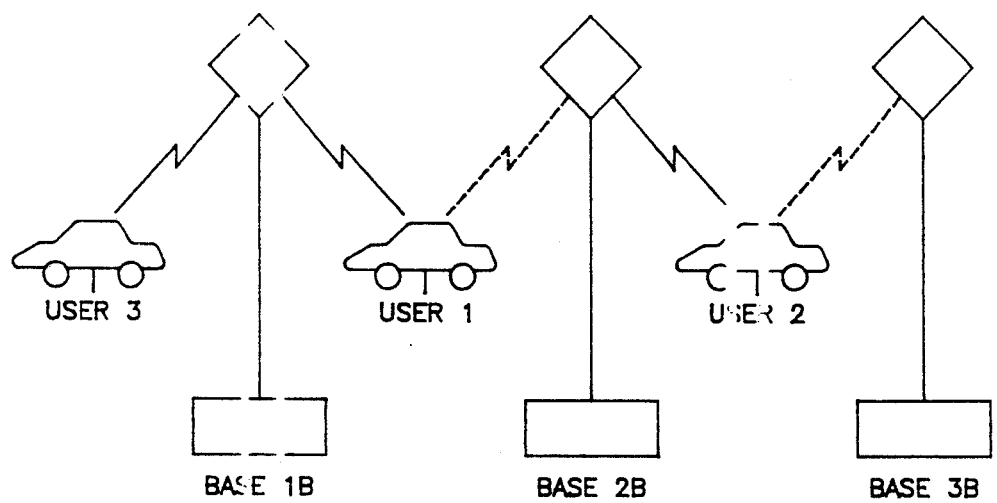
FIG. 1 is a pictorial diagram useful in explaining the invention.

It has been found that the actual efficiency of spread spectrum systems with CDMA technology is not as indicated above. This is because of the fact that if several users are assigned codes that are highly correlated with (close to) each other, these similar codes will cause interference problems, and the spectral efficiency is less than anticipated. The methods of calculating such interference possibilities are known, as discussed in the book, "Random Signals and Noise" by Davenport and Root, published by McGraw-Hill, 1958.

It can be theoretically extrapolated that in system with CDMA technology, up to 100 users can be placed on a single base site on a one megacycle band channel. One of the problems is to prevent any of the users from transmitting too much power, since one user with a lot of power can prevent dozens of other users from having satisfactory communications. Assuming that the powers of the various users can be controlled accurately, then spread spectrum offers the potential of up to 100 users at a site. However, because these users will also transmit inadvertently to other sites, the number of 100 users will not be achieved in an actual commercial system since typically one can assume that a user would be involved in communications with 2 or 3 sites.

In a large cellular area, the potential number of subscribers to a spread spectrum cellular system is typically over 100,000 users. For purposes of operation each of these users is given a CDMA address in advance. A typical address code for User 1 could be as follows (18 digits long):

| 0 1 1 1 0 | 0 1 1 0 0 | 0 1 1 0 0 | 1 1 0 |
|---|---|---|---|

The fact that at least 100,000 different addresses are required dictates that the code be at least 18 digits long.

| 2 to the fifth | = | 32 |
|---|---|---|
| 2 to the tenth | = | 1,000 |
| 2 to the twenty | = | 1,000,000 |

However, if a code system with only 18 characters is used, many codes would be very similar to each other. In fact, there could be 18 different people who would be only one character different from User 1. There would be about 18 times 17 or about 300 people with codes having only two characters different from User 1. And there would be about 5,000 people that were only three characters different from User 1.

In normal correlation technology receivers looking for a code of 18 bits in length, randomness would dictate that about 9 bits in common would be normal. Most of the samples would have perhaps 7 to 11 common bits. A fifteen bit correlation would be rare. However, this 15 bit correlation could occur with about 5,000 different people. Also, a 15 bit correlation would be very apt to trigger the receiver, and cause interference.

With 100,000 different potential subscribers, and 5,000 different people who could cause User 1 a problem, the approximate probability is one in twenty that a given user will cause User 1 a problem. If there are up to 300 users on a single site, then it seems that User 1 is actually destined to have interference.

The well known concept called the "Hamming distance" relates to the closeness of codes. Accordingly a solution to distinguishing the users is to make the 18 digit codes even longer to insure that there are fewer address codes that are close to each other. If, for example, an additional 12 digits is added to each address, the codes would be 30 bits long and close or non-distinguishing codes would be diminished. However, long codes are wasteful of spectrum, and with such long codes, the ability to hear a signal 20 DB below the noise level would not be achieved.

The present invention discloses a method of assigning shorter codes on a real time basis based upon an analysis of signal strength in the entire spread spectrum cellular system. U.S. Pat. No. 4,736,453 of the same inventor discloses a system and method wherein and interface matrix is developed for pairs of users based upon actual signal strengths received which users could not exist on the same channel. The system provides power control procedures, and those signal of strength or amplitude that are over threshold will be considered. The present invention discloses a system and method for developing an influence matrix based upon the concept of user who can not exist with correlated codes.

The issue of power control is very important. Fortunately, because the base sites all transmit the same power, the mobiles will all hear from the desired base both wanted an unwanted signals of the same power. When all signals are of the same power, the correlation receivers can work most efficiently. When unwanted signals are no stronger than the desired signal, the correlation receivers work best.

However, users will normally be moving, and the strongest signal being received by a mobile user will not come from his base. The solution to this problem lies in handing-off the user always to the strongest base when ever possible.

The basic problem arises from the base site receiving system when signals arrive at many different amplitudes. Mobiles with good propagation paths (either having line of sight paths, or being close to the base) will send strong signals to the base while mobiles that have poor paths will send weak signals. The solution to this problem is, and as substantially described in U.S. Pat. No. 4,736,453, to set a reference or goal at the base site receivers of a received signal strength of a given DB over threshold. In the present system, a 15 DB threshold is selected. If the goal is made too high, then distant mobiles would never be heard. If the goal is made too weak, then everybody has trouble with the background noise.) The transmitter power of the mobile is then controlled such that the received signal strength at the base site receiver system is as close to 15 DB over threshold as possible.

As an example, refer now to FIG. 1 wherein the cellular system is operating with spread spectrum and CDMA technology. Let us assume that User 1 is assigned to Base 1B and that User 2 is assigned to Base 2B. (User 3 is not involved as yet.) User 1 can also reach base site 2B. Consequently, User 1 has the possibility of interfering with User 2 at the base site 2B. If the signal strengths are in the correct ratio, and if the address codes of User 2 and User 1 are not properly chosen, then User 1 will interfere with User 2 at base site 2B.

Now, let us assume that User 3 is to be added to the system at base site 1B. Here, there is the possibility that User 3 will interfere with User 1 and also that User 1 will interfere with User 3 at Base Site 1B. Consequently, before adding User 3 to the system, the system must generate a code for User 3 that has sufficient distance from the code for User 1. Consequently, the system will choose a code for User 3 that is not closely correlated with the code for User 1.

Figure 2:
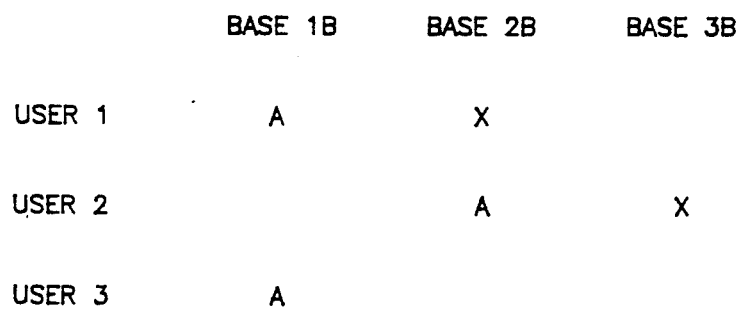
FIG. 2 is a matrix useful to describe the users and base site relations.
Figure 3:
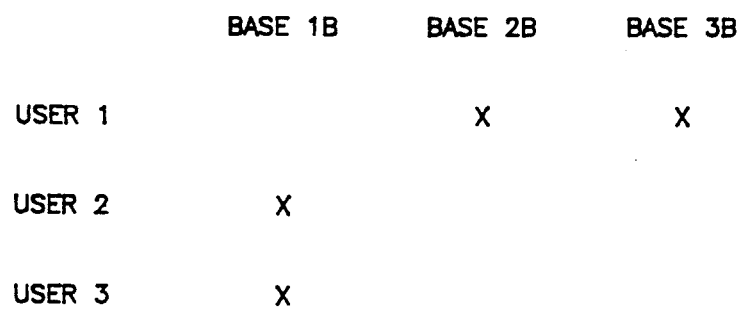
FIG. 3 is a matrix derived from the matrix of FIG. 2 indicating the relation between the users.

The method of assigning the users to base sites and the method of developing the address codes can be represented by the matrix relations shown in FIGS. 2 and 3. The matrix shown in FIG. 2, shows the relation of the various users and base sites. In FIG. 2 the rows represent users and the columns represent base sites. For example, User 1 is assigned to Base 1B. The symbol "A" indicates that this base site not only can be reached but that this is an assigned base site. The symbol "X" indicates that the user can reach that base site. For example, User 1 can reach Base 2B and User 2 can reach Base 3B.

Refer now to FIG. 3 which shows a matrix derived from the matrix of FIG. 2. In this matrix of FIG. 3, the rows represent users and the columns also represent users. Users which share a given base site where at least one of them is assigned are given non-correlated codes. To obtain the matrix of FIG. 3 each column in the matrix of FIG. 2 is sequentially examined. In column 1 (for Base 1B) we note that User 1 and User 3 are critical in that they need noncorrelated codes. Consequently, an "X" is placed in the matrix of FIG. 3 at the intersection of User 1 and User 3.

Thus, the matrix of FIG. 3 indicates those users which need to be given address codes that are not related. More specifically, from the matrix of FIG. 2, it can be seen that if User 1 and User 2 are already talking, and User 3 is to be added, the system should insure that the code chosen for User 3 would not be correlated with the already chosen code for User 1. A code correlation with User 2 need not be considered. This procedure also protects the mobile receiver in view of signal path reciprocity.

A random number generator is used to make a tentative address. Most modern computer languages include a random number generator. To generate a random code, one first generates a random number between 0 and 1.0, and then maps that number into the corresponding binary number. A preloaded table permits a fast operation. For example, to generate a 2 digit random binary code, one uses the decimal random number generator to generate a number between 0 and 1.0 and then maps as follows:

| |
|---|
| .00 to .25 corresponds to 0 0 |
| .25 to .50 corresponds to 0 1 |
| .50 to .75 corresponds to 1 0 |
| and .75 to 1.00 corresponds to 1 1 |

In the above manner groups of 0s and 1s are generated until a tentative address code is created of the desired length. If one tries to generate too many digits at once, then the table look up becomes too time consuming. Other approaches for creating addresses with minimum distances away from other addresses are known, however, the foregoing has been found to be convenient and simple.

Next, the address selected is then compared with the other addresses that should not be correlated. If the comparison shows that his code is inadequate, then another random code is attempted.

| For example: (Assume a 14 digits long code) | | | |
|---|---|---|---|
| Code for User 1: | 1 1 1 0 0 | 1 0 0 1 0 | 1 1 1 0 |
| Code prepared for User 3: | 0 1 1 1 0 | 0 0 1 1 0 | 0 1 1 1 |
| Comparison: | 1 0 0 1 0 | 1 0 1 0 0 | 1 0 0 1 |

In the above "comparison" the distance between the two sample codes (for User 1 and User 3) is a total of six differences, and this is an adequate distance to insure interference free communications.

Figure 6:
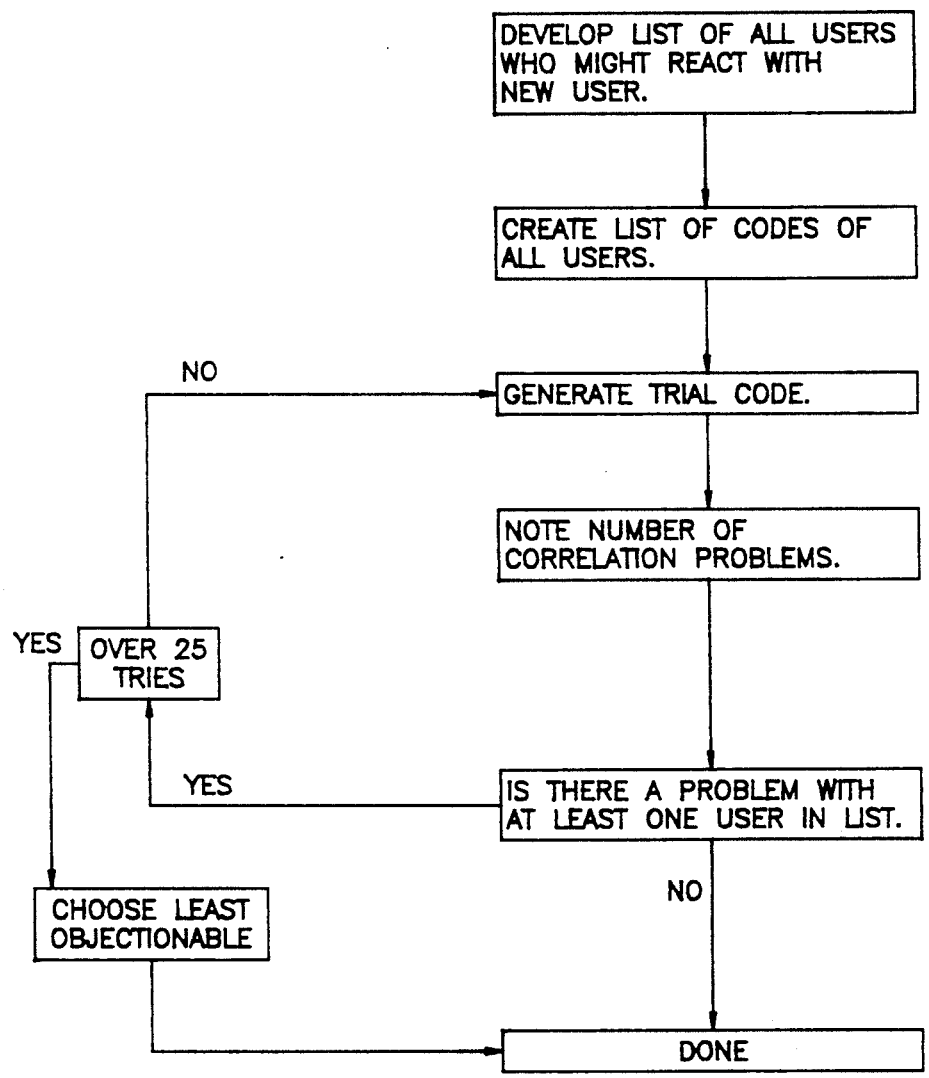
FIG. 6 shows a flow chart of a method for creating a code for a new user in accordance with the invention.

The self explanatory flow chart of FIG. 6 depicts steps in the method described above for creating a code for a new user.

Figure 4:
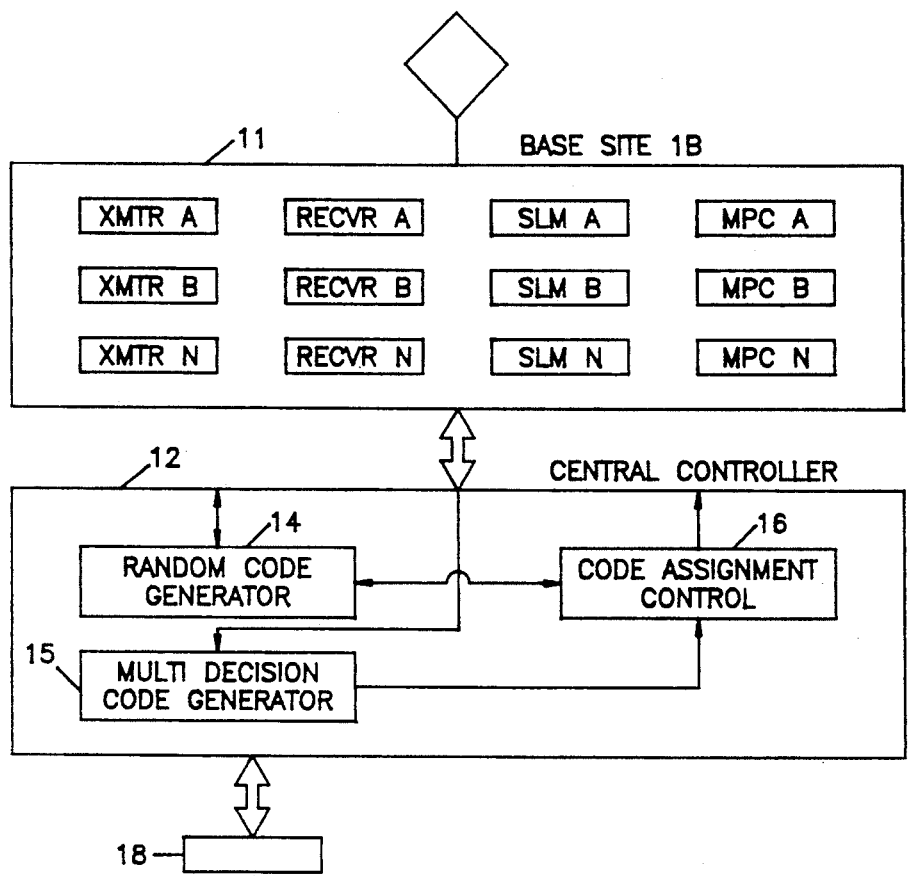
FIG. 4 shows a block diagram of one base site of a radio telephone communications system with a central controller in accordance with the invention.
Figure 5:
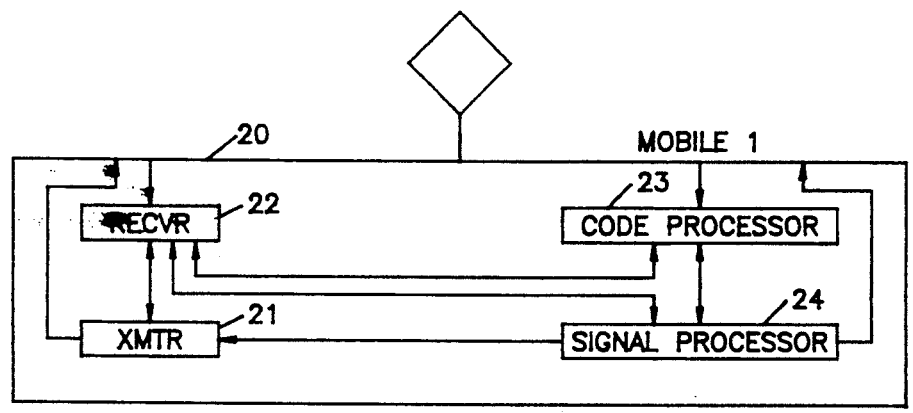
FIG. 5 shows a block diagram of one user (mobile) unit of a radio telephone communications system with a central controller in accordance with the invention.

Refer now to FIGS. 4 and 5 as well as to FIG. 1. The system block diagram for one preferred embodiment of the system is depicted in FIGS. 4 and 5. FIG. 4 depicts one of a plurality of base sites in a known type cellular radio telephone system 11. In the system 11 of FIG. 4, the base site labeled 1B is connected as by electrical and signal wire lines to a central controller 12. As is known, base 1B and all the other base sites in the systems include known plurality of transmitters generally labeled XMTR A, B, N, and receivers labeled RECVR A, B, N level monitors labeled SLM A, B, N and mobile power controls labeled MPC A, B, N. In the central controller 12 includes a random code generator 14 and a multi-decision process code generator 15 and a code assignment control 16. The central controller 12 is connected by signal wire lines to the known land line terminals 18.

FIG. 5 depicts a user or mobile unit 20 of a cellular system 11 such as in FIG. 4. In FIG. 4, the mobile unit includes a known transmitter 21, receiver 22, code processor 23, and a signal processor 24. In the system 11 of FIG. 4 when 20 is handed off to a new base site, a new code must be generated for that mobile, as new interference possibilities are created. Because the new and the old site might be part of an assignment oscillation between sites, the new code must be non-correlated to both the old site and the new site codes per the matrices as above.

Assuming a maximum of 5,000 users talking at the same time in a large metropolitan area (about 5% of the total cellular phones would then be in use) based upon signal strength analysis only 500 users would be within communications distance of a given site. The present system and method creates affirmative, modified, or short codes for those 500 users that are not correlated with each other. (The number of users to be considered is reduced in practice because the users are divided into groups and placed into adjacent sub-bands of spectrum.)

As an alternative approach to generating a new code by trial and error, a good code for a new user may be generated by a method related to dynamic programming and described by Richard Bellman in a book entitled "Dynamic Programming" published by the Princeton University Press, 1957.

The Bellman theory of optimality as applied to code generation would mean that one could generate the optimum code (the one with the maximum distance from any/all codes) for the new user by generating it a digit at a time. The methodology is covered in the aforementioned book. Basically, the approach is to generate the two possibilities (0,1) for the nth digit of the code and then eliminate from consideration all except the ones with the most distance from the other codes. For example, if all the users in the group happened by chance to begin with a 0, then it is the case that the optimum code for a new user would begin with a 1. Consequently, one does not need to carry forward any codes beginning with a 0. However, it has been found that too many codes have to be carried forward to be a practical approach.

In view of the foregoing, a method was initiated that carries forward a limited or trial number of choices. Naturally, when one carries forward to the next stage of the decision process only the very best choices, and not all choices that might lead to the optimum code, the possibility exists that the optimum code would be missed. However, the computer running time is reduced by such a strategy, and useful codes were generated.

The generation of a limited or trial code by a multi-stage decision process related to dynamic programming provided the following results:

It was found that computer running time is very fast for the Random Method of generating a code as described above and shown in FIG. 6 increases approximately proportionally to the number of random codes generated. The limited or trail method does surprisingly well with only a very limited number of trials. (i.e., although one would suspect that one would need about 25 different attempts to generate a good code, it turned out that only 3 or 5 different random attempts generated useful codes.) A further analysis confirmed the results since the system is actually only trying to protect against the random chance of assigning a new user a code that is very close to one of the existing codes. Given a choice of three different codes, probability is that at least one of them is sufficiently different enough from the previously assigned codes.

Figure 7:
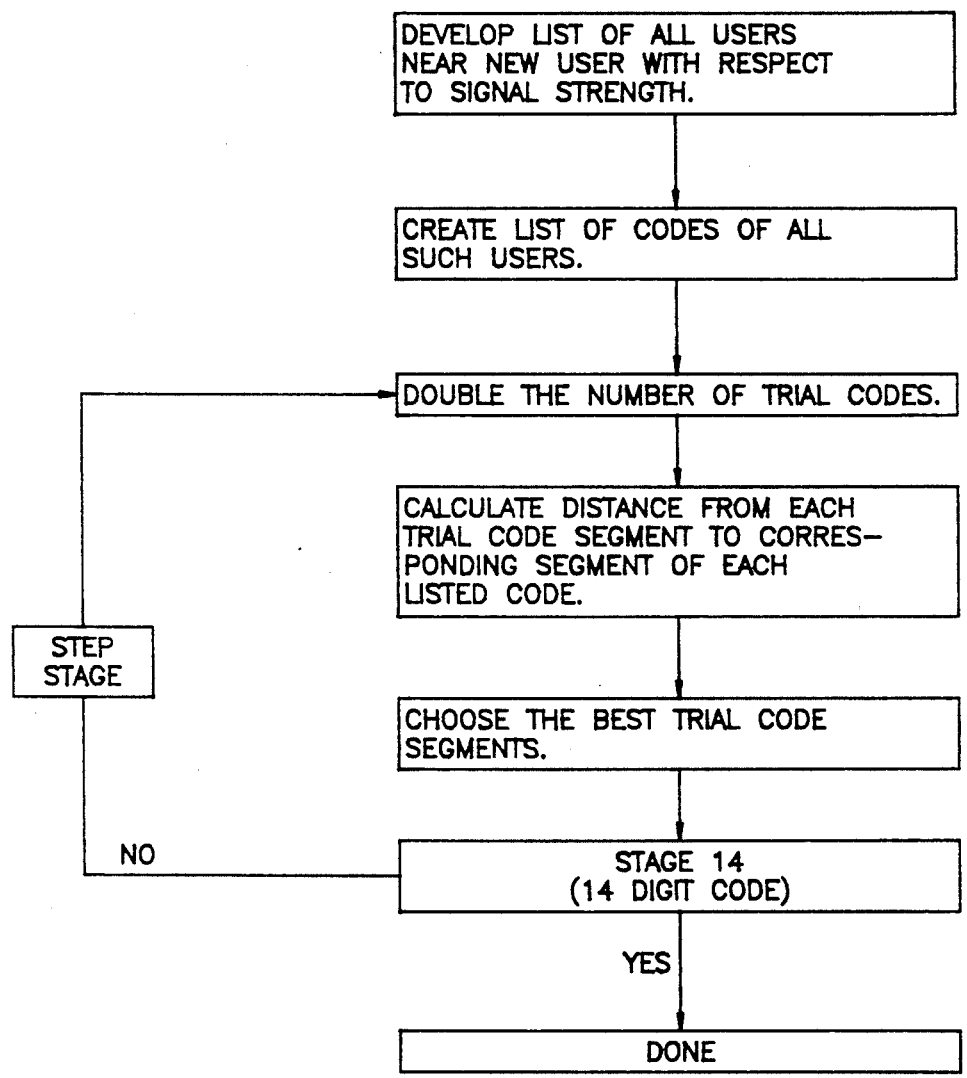
FIG. 7 shows a multistage method of code generation in accordance with the invention.

A multistage decision approach will yield the best codes, but the computer running time is longer than the random approach. This method is depicted in the flow chart of FIG. 7.

The following summary table is presented as an example to show the minimum distance from the best real code to the closest previously assigned code. A code length of 14 digits was standard in all the computer runs.

|         | SUMMARY |   |    |    |       |   |
|         | Random  |   |    |    | Multi |   |
| Talkers | 3       | 5 | 10 | 25 | 1     | 2 |
| 5       | 4       | 6 | 6  | 6  | 6     | 7 |
| 10      | 5       | 5 | 5  | 5  | 6     | 6 |
| 20      | 4       | 4 | 5  | 5  | 4     | 5 |

The above table is read as follows: If there were 10 previous assigned talkers, and 5 random codes are generated, the code is chosen that has the maximum minimum distance away from the other codes, the minimum distance to that code would be the number 5 in the table.

The first four columns of data are for the Random approach, and the last two columns are for the multistage decision process. In the 1-Multi column, only the single best code from decision stage to decision stage is carried forward. In the 2-Multi column, the two best codes from each stage to the next stage are carried forward.

It should be noted that the minimum distance of the new code in all instances is over 4 which should be adequate for a 14 digit code to avoid cross talk or accidental interference. Naturally, however, greater minimum distances are even better.

The foregoing real time dynamic procedure of generating a low correlation code for each new user in effect creates sets of local codes for each base site. Since each new user is given a code that is not highly correlated with other user's codes at the same base site, and since each new user is given a code that also is not highly correlated with each other users at other base sites who might cause or be caused interference, this procedure in effect creates local sets of low correlated codes for each base site.

The foregoing procedure creates local subsets of non correlated codes. In flat terrains, these local sets of low correlation codes will be local to a given geographic area. In hilly terrains, these local codes will be local to a subset of users.

The foregoing procedure creates local subsets of codes for a given subset of users. These local code subsets will be overlapped across adjacent (In a signal strength sense, and usually also a geographic sense) base sites. A given code or group of codes may be reused in another part of the system if there is adequate separation.

Figure 8:
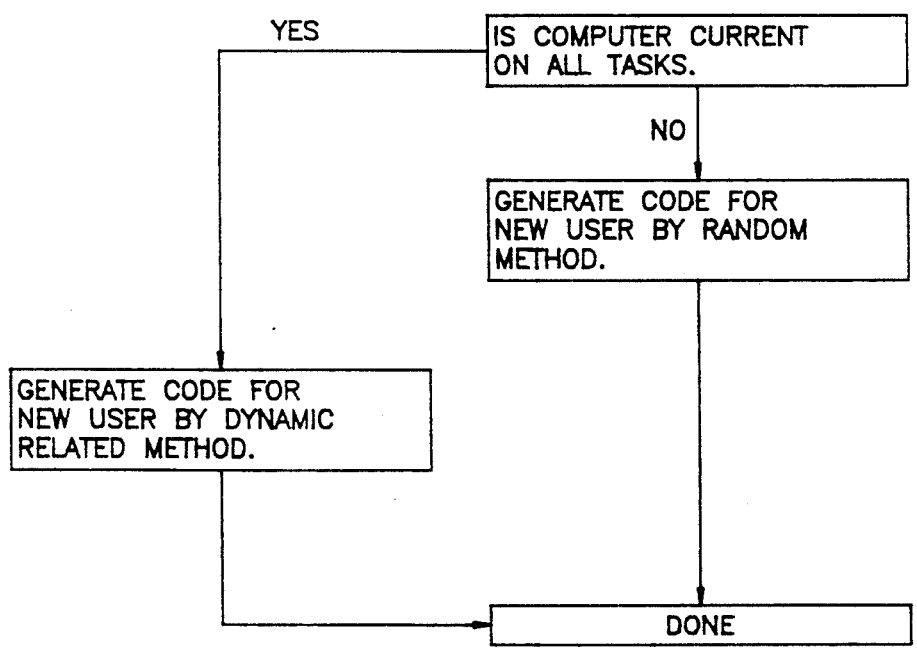
FIG. 8 shows a flow chart of a method of code generation in accordance with the invention.
Figure 1:
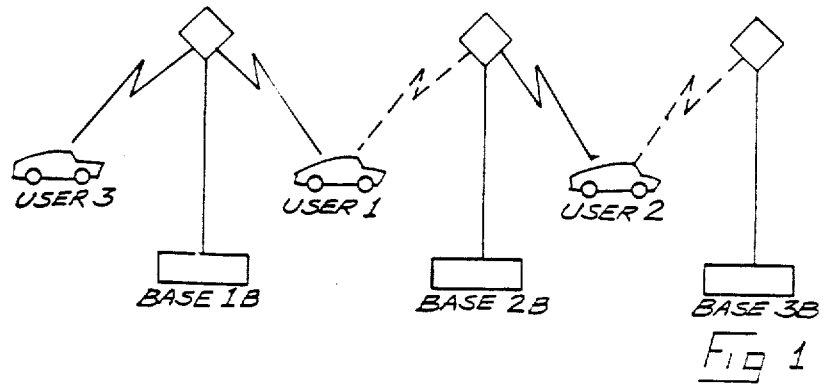
Figure 2:
Figure 3:
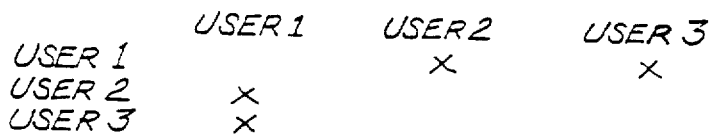

In the preferred embodiment of the system a two tier method is used. This is depicted in the flow chart of FIG. 8. When the central processor computer is overloaded and backlogged and does not have time to choose a good code by the Multi decision process, the method of 3 Random as shown above is chosen. However, when computer processing time is available, then the multistage decision process in chosen. Extra memory is needed to store the additional program for the multistage decision process, but the advantages of a better code assignment scheme results in better communications with less crosstalk errors.

Although particular embodiments of the present invention have been described and illustrated herein, it should be recognized that modifications and variations may readily occur to those skilled in the art and that such modifications and variations may be made without departing from one spirit and scope of my invention. Consequently, my invention as claimed below may be practiced otherwise than as specifically described above.

I claim:

1. A radiotelephone communication system utilizing CDMA/direct sequence spread spectrum and code division multiple access techniques comprising:
    a) a plurality of base sites each having transmitters and receivers transmitting and receiving communicating signals on selected bands,
    b) a plurality of first mobile units each having transmitting and receiver means transmitting and receiving communication signals on selected bands,
    c) means for adding new mobile units to said system,
    d) means for determining those first mobile units whose transmitted signals are above a selected threshold and which signals could potentially cause interference with said new mobile units,
    e) means for generating non-correlated address codes for each new mobile unit which codes are spaced a selected minimum Hamming distance from any other code in use by said first mobile units, and
    f) means for assigning non-correlated address codes to each new mobile unit.

2. In a radiotelephone communications system utilizing CDMA/direct sequence spread spectrum modulation techniques, said system having multiple base sites each having multiple transmitters and receivers and multiple mobile units each having transmitters and receivers for transmitting and receiving communicating signals, a method of creating groups of local low correlation codes comprising the steps of:
    a) comparing the signal strength of signals being transmitted by mobile transmitters operating in said system with a selected reference,
    b) determining groups of mobile units whose signal strengths are high and indicate that units in said group could potentially cause interference with each other,
    c) developing non-correlated address codes which codes are spaced a selected minimum Hamming distance from any code in use by those potentially interfering units, and
    d) assigning said non-correlated address codes to respective new mobile units.

3. A method as in claim 2 wherein a first step is to attempt to develop said local address codes by a random number generator, and a second and subsequent step is to develop said local address codes by a multistage decision process.

4. In a radiotelephone communication system having multiple base sites and multiple mobile units operating in the system utilizing CDMA/direct sequence spread spectrum modulation techniques, and using preassigned address codes of a given length, a method of creating a shorter new address code for a new mobile unit entering the system comprising the steps of:

a) analyzing the signal strengths of the old and new mobile units,
b) making a list of operating units which could potentially cause interference with said new unit,
c) creating a local and relatively shorter new address code for the new mobile unit if interference would occur, which code has a minimum Hamming distance of at least four characters from codes used by the operating mobile units, and
c) assigning said local code to said new mobile unit.

5. A method as in claim 2 wherein said local codes are created by using a random number generator.

6. A method as in claim 2 wherein said local codes are selected by a multistage decision process.

* * * * *

UNITED STATES PATENT AND TRADEMARK OFFICE
CERTIFICATE OF CORRECTION

PATENT NO. : 5,206,882

DATED : Arpil 27, 1993

INVENTOR(S) : Gerald R. Schloemer

Page 1 of 2

It is certified that error appears in the above-indentified patent and that said Letters Patent is hereby corrected as shown below:

Delete Drawing Sheet 1 and substitute therefor the Drawing Sheet consisting of corrected FIG. 3 as shown on the attached page.

Column 7, line 3, correct "trail" to --trial--.

Signed and Sealed this

Tenth Day of May, 1994

*Attest:*

BRUCE LEHMAN

*Attesting Officer*     *Commissioner of Patents and Trademarks*